United States Patent
Bolcar

(10) Patent No.: US 7,247,266 B2
(45) Date of Patent: Jul. 24, 2007

(54) LUBRICATING COATING AND APPLICATION PROCESS FOR ELASTOMERIC ELECTRICAL CABLE ACCESSORIES

(75) Inventor: John P. Bolcar, Bangor, PA (US)

(73) Assignee: Thomas & Betts International Inc., Wilmington, DE (US)

( * ) Notice: Subject to any disclaimer, the term of this patent is extended or adjusted under 35 U.S.C. 154(b) by 538 days.

(21) Appl. No.: 10/410,616

(22) Filed: Apr. 9, 2003

(65) Prior Publication Data

US 2003/0234472 A1 Dec. 25, 2003

Related U.S. Application Data

(60) Provisional application No. 60/371,371, filed on Apr. 10, 2002, provisional application No. 60/373,129, filed on Apr. 16, 2002.

(51) Int. Cl.
B29C 41/02 (2006.01)
B29C 41/22 (2006.01)

(52) U.S. Cl. .................. 264/130; 264/255; 264/272.11
(58) Field of Classification Search ...................... None
See application file for complete search history.

(56) References Cited

U.S. PATENT DOCUMENTS

| | | | | |
|---|---|---|---|---|
| 3,050,490 A | * | 8/1962 | Nitzsche et al. | 524/404 |
| 3,082,485 A | * | 3/1963 | Thomas | 384/203 |
| 3,576,938 A | * | 5/1971 | Capotosto et al. | 174/196 |
| 3,595,950 A | | 7/1971 | Mezynski | |
| 3,657,469 A | * | 4/1972 | Ryder | 174/73.1 |
| 3,993,387 A | * | 11/1976 | Venezia | 439/89 |
| T953,007 I4 | | 12/1976 | Tachick et al. | |
| 4,035,534 A | * | 7/1977 | Nyberg | 428/34.9 |
| 4,314,093 A | * | 2/1982 | Eldridge et al. | 174/73.1 |
| 4,348,348 A | * | 9/1982 | Bennett et al. | 264/255 |
| 4,373,048 A | | 2/1983 | Schubert et al. | |
| 4,398,785 A | * | 8/1983 | Hedrick | 439/695 |
| 4,681,691 A | | 7/1987 | Schriver, Jr. | |
| 4,704,176 A | * | 11/1987 | Botzman | 156/125 |
| 4,857,397 A | | 8/1989 | Mowdood et al. | |
| 4,923,550 A | * | 5/1990 | Kramer | 156/242 |
| 5,061,424 A | * | 10/1991 | Karimi et al. | 264/173.19 |
| 5,152,944 A | * | 10/1992 | Khalil | 264/135 |
| 5,229,176 A | * | 7/1993 | Freeman | 428/34.7 |
| 5,716,223 A | * | 2/1998 | Phillips et al. | 439/125 |
| 6,034,325 A | | 3/2000 | Nattel et al. | |
| 6,168,447 B1 | | 1/2001 | Stepniak et al. | |
| 6,306,514 B1 | * | 10/2001 | Weikel et al. | 428/451 |
| 6,319,449 B1 | | 11/2001 | Campbell et al. | |
| 6,479,580 B1 | | 11/2002 | Chorvath et al. | |

FOREIGN PATENT DOCUMENTS

EP 0 168 020 * 1/2005

* cited by examiner

Primary Examiner—Edmund H. Lee
(74) Attorney, Agent, or Firm—Hoffmann & Baron, LLP

(57) ABSTRACT

This invention relates to a method for coating an elastomeric component with a coating that has a low coefficient of friction and the articles formed by the method. The method includes preparing an elastomeric coating; applying the coating to a substrate; contacting the coated substrate with an elastomeric compound; and heating the elastomeric compound and the coated substrate under pressure to bond the coating to the elastomeric compound and form a coated elastomeric component.

10 Claims, 2 Drawing Sheets

LUBRICATING COATING AND APPLICATION PROCESS FOR ELASTOMERIC ELECTRICAL CABLE ACCESSORIES

This application claims priority based on provisional U.S. patent application Ser. No. 60/371,371, filed on Apr. 10, 2002 now abandoned and provisional U.S. patent application Ser. No. 60/373,129, filed on Apr. 16, 2002 now abandoned.

FIELD OF THE INVENTION

The present invention relates to electrical cable assemblies. More particularly, the present invention relates to a process for applying a permanent lubricated surface to elastomeric electrical cable accessories.

BACKGROUND OF THE INVENTION

Elastomeric electrical cable accessories are typically installed over cables, metallic contacts or mated in complimentary designs such as elbows and bushings, connectors, splices, switches, fuses, junctions and a wide variety of other configurations. In almost every design, installation requires interfaces to slide against each other with corresponding frictional forces. Because these components are elastomeric, these frictional forces are very high. Thus lubrication of these interfaces is a necessity. The most common lubricants are oils and greases, typically based on a compatibility with the type of elastomer requiring lubrication. Silicone oils and greases exhibit excellent electrical characteristics and are very compatible with ethylene-propylene based elastomers. These lubricants are usually supplied by the manufactures at significant cost as a separate package with the cable accessories.

A large majority of cable accessories are based on ethylene-propylene elastomers such as ethylene-propylene rubber (EPR) and ethylene propylene diene monomer (also referred to as ethylene propylene diene methyl or EPDM) and are typically lubricated with silicone-based oils and greases. EPR is a thermoset material synthesized from ethylene, propylene and, in many instances, a third monomer. If only ethylene and propylene are used, the polymer may be referred to as EPM. If three monomers are used, the resulting polymer is called EPDM. Peroxide is the predominant cross-linking agent for EPR compounds.

Cable accessories have a 30- to 40-year life, and many have separable interfaces used for connection and disconnection. Although many oils and greases are high quality and are used effectively for many years of service, they often lose their lubricating capacity over time. Due to the inherent mobility of the oils used in these lubricants, they tend to "bleed" and/or migrate away from the interface. Consequently, the interface "dries out" and exposes the high coefficient of friction elastomeric surface. The result is component sticking which is deemed a major problem in the industry.

Accordingly, there is a need for a more reliable and cost-effective formulated coating and application process to provide a more permanent lubricated surface to an elastomeric electrical cable accessory.

SUMMARY OF THE INVENTION

This invention relates to a method for coating an elastomeric component and the articles formed by the method. The method includes preparing an elastomeric coating that includes an elastomeric material and a lubricating constituent; applying the coating to a substrate; contacting the coated substrate with an elastomeric compound; and heating the elastomeric compound and the coated substrate under pressure to bond the coating to the elastomeric compound and form a coated elastomeric component.

The coating formulation includes a constituent which imparts lubricity so that the surface of the coated elastomeric component has a coefficient of friction that is less than the coefficient of friction of the surface of an uncoated elastomeric component. The coating has a thickness of from 0.0005 to 0.020 inches and provides lubrication to the surface of a component without having to add a lubricant to the elastomeric compound that is used to form the component.

The coated substrate can be encapsulated with the elastomeric compound or the elastomeric compound can be encapsulated by the coated substrate. Preferably, the coated substrate is placed in a mold prior to encapsulation. After the coated elastomeric component has been formed, additional lubrication can be provided by contacting the surface with a lubricant such as polydimethylsiloxane (silicone oil), perfluoropolyether, fluorosilicone, phenylmethylpolysiloxane or alkymethylpolysiloxane.

In a preferred embodiment, the elastomeric coating includes a polymer such as EPDM (ethylene propylene diene monomer) elastomer, EPR or EPM (ethylene propylene rubber), NBR (acrylonitrile-butadiene rubber), NR (natural rubber), BR (butadiene rubber), IR (isoprene rubber), CSM (chloro-sulfonyl-polyethylene), VMQ (vinyl silicone), PVMQ (phenyl methyl vinyl silicone), FVMQ (flouro methyl vinyl silicone), and ECO (epichlorohydrin rubber). Especially preferred elastomeric materials are peroxide curable elastomeric polymers.

The lubricating constituent is a material that has a coefficient of friction that is less than the coefficient of the elastomeric material used in the coating. Preferred lubricating materials are powdered materials having a coefficient of friction that is less than the coefficient of friction of the elastomeric material, preferably a thermoplastic, nylon, polytetrafluorethylene, a silica, glass microbeads or a fine sand.

In preferred embodiments, either the elastomeric coating or the elastomeric compound includes a catalyst. The catalyst promotes cross-linking between the coating and the elastomeric component during curing. Preferred catalysts include a peroxide. The elastomeric coating formulations can also include a solvent, such as toluene, xylenes, ketones, or other known solvents used in coating formulations.

A preferred embodiment of the present invention is a method for manufacturing an electrical cable accessory that includes the steps of providing a substrate having a desired contour in relation to the electrical cable accessory; coating the substrate with an elastomeric material that includes a lubricating constituent to form a coated substrate; contacting the coated substrate with an uncured elastomeric compound; and curing the elastomeric material and elastomeric compound by applying heat and pressure sufficient to transfer the elastomeric material to the elastomeric compound by chemical bonding. The coated substrate can be encapsulated with the elastomeric compound or the elastomeric compound can be encapsulated by the coated substrate.

Another embodiment of the present invention is an article of manufacture for connecting an electrical cable. The article of manufacture includes an elastomeric material having a lubricating constituent transferred to and chemically bonded with an elastomeric component by molding the elastomeric component while in contact with the elastomeric material and concurrently curing the elastomeric component and elastomeric material.

Another preferred embodiment of the present invention is an electrical cable accessory that includes: a coating-formed elastomeric material portion, wherein the elastomeric material includes a lubricating constituent; and an elastomeric component portion molded while in contact with the elastomeric material portion. The elastomeric material portion and the elastomeric component portion are concurrently cured to effect transfer of the elastomeric material portion to the elastomeric component portion by chemical bonding.

The coated elastomeric components of the present invention provide surface lubricated elastomeric components that have lower coefficients of friction than the uncoated elastomeric components that are currently in use.

BRIEF DESCRIPTION OF THE DRAWINGS

Other objects and many attendant features of this invention will be readily appreciated as the invention becomes better understood by reference to the following detailed description when considered in connection with the accompanying drawings wherein.

DETAILED DESCRIPTION OF THE INVENTION

The invention relates to the application of an elastomeric coating to an elastomeric component and particularly a lubricating elastomeric coating. The invention consists of a formulated elastomeric lubricating coating and a process by which this coating is transferred from an intermediate substrate to an elastomeric component surface during the cure of the elastomeric component. The resulting coating provides permanent lubricity to the elastomeric surface by reducing the coefficient of friction and allowing the component to be installed without the use of an external lubricant such as oil or grease. Alternatively, if oil or grease is still desired, the coating exists as permanent back-up lubrication should the oil or grease "dry out."

The elastomeric coatings are prepared by combining a polymer such as EPDM (ethylene propylene diene monomer) elastomer, EPR or EPM (ethylene propylene rubber), NBR (acrylonitrile-butadiene rubber), NR (natural rubber), BR (butadiene rubber), IR (isoprene rubber), CSM (chlorosulfonyl-polyethylene), VMQ (vinyl silicone), PVMQ (phenyl methyl vinyl silicone), FVMQ (flouro methyl vinyl silicone), and ECO (epichlorohydrin rubber) with other constituents and one or more solvents. The other constituents can include zinc oxide, paraffin wax, calcined clay, polytetrafluoroethylene powder, paraffinic oil and silane. If the batch materials are coarse (i.e., they have a fineness of grind less than 2 NS), they can be milled to a fineness of grind greater than 2 NS. In preferred embodiments, the elastomeric compound onto which the coating is applied include a peroxide to effect cross-linking between the coating and the elastomeric compound.

The elastomeric coating is applied to a substrate by well known methods which include brushing, dip spraying, draw-down coating and roller coating. The applied coating has a thickness of from 0.0005 to 0.020 inches, preferably from 0.0005 to 0.010 inches and most preferably 0.0005 to 0.005 inches. The elastomeric coating includes a lubricating constituent which has a coefficient of friction that is less than the coefficient of the elastomeric material in the elastomeric component. These lubricating constituents are typically in a powder form and can include a thermoplastic, nylon, polytetrafluorethylene, a silica, glass microbeads or a fine sand. In another embodiment, the elastomeric coating includes a catalyst, preferably a peroxide.

Figure 2:
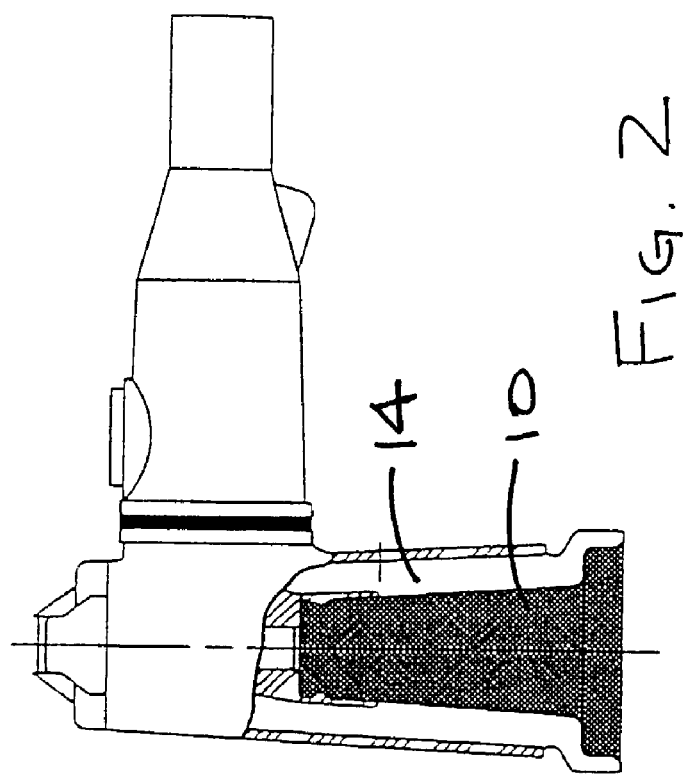
FIG. 2 shows a lubricating coating transferred to a load-break elbow.
Figure 1:
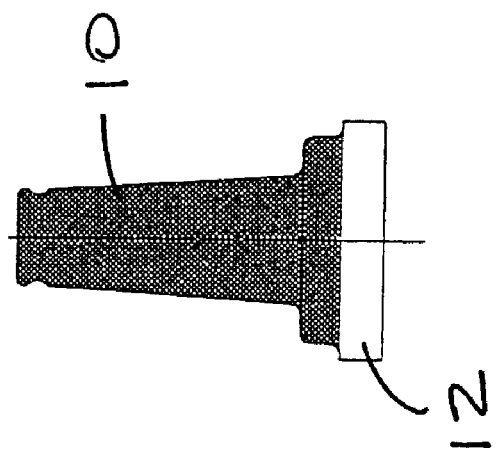
FIG. 1 shows a lubricating coating formed on a steel mandrel prior to molding and transfer.

The process of the present invention includes the transfer of a conventionally applied elastomeric coating containing a lubricating constituent from an intermediate substrate to an elastomeric component during cure of the coating and elastomeric component. FIG. 1 shows a lubricated elastomeric coating 10 formed on a substrate which has the form of a steel mandrel 12. After the elastomeric coating 10 is formed and the solvents have evaporated (i.e., volatilized), it is placed in a cavity formed by an elastomeric compound. The combined elastomeric coating 10 and elastomeric compound are molded to form the elastomeric component 14 shown in FIG. 2 and the mandrel 12 is removed. During the molding process, the elastomeric coating and elastomeric compound are cured and chemically bonded together.

Figure 4:
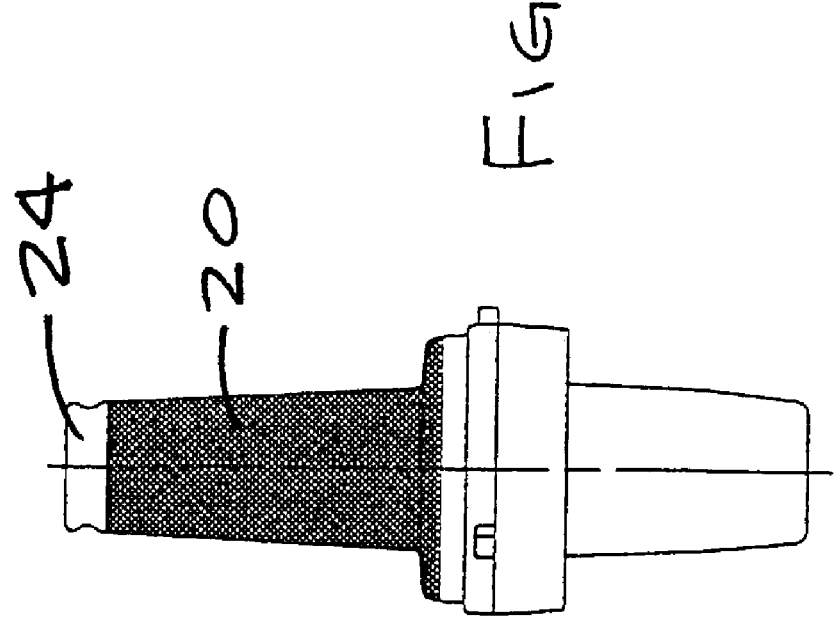
FIG. 4 shows a lubricating coating transferred to a load-break bushing.
Figure 3:
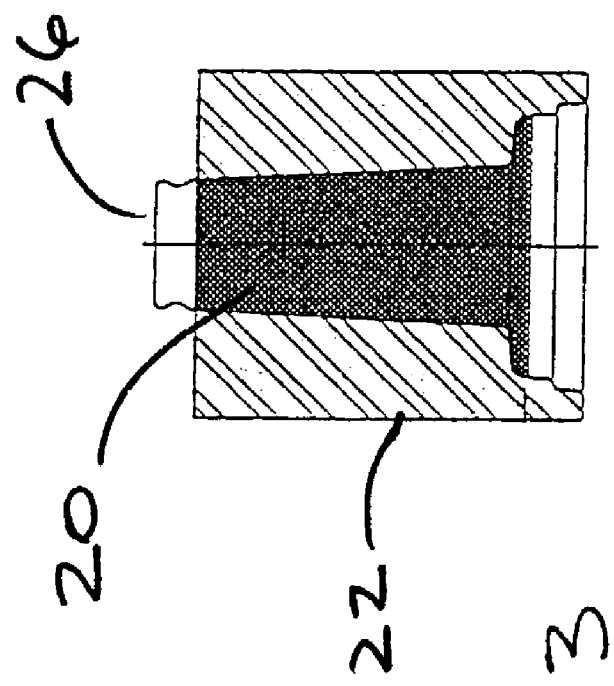
FIG. 3 shows a lubricating coating formed in a steel mold prior to transfer.

FIGS. 3 and 4 show another embodiment of the present invention wherein the elastomeric coating 20 is formed on the interior surface of a mold 22. In one embodiment, the elastomeric coating is formed on the inner surface of a sleeve (not shown in FIG. 3) which is then placed in a mold. An uncured elastomeric compound 26 contacts the coating 20. The elastomeric coating 20 and uncured compound are then cured to form a coated elastomeric component 24.

During the "transfer" process, the coating is cured or "vulcanized" and chemically bonded to the surface of the elastomeric component when the elastomeric component is formed by the molding or "vulcanization" of an elastomeric compound. Curing or "vulcanization" and chemical bonding of the coating to the elastomeric component occurs as a result of the diffusion of the peroxide catalyst from the bulk elastomeric compound into the coating. Since the catalyst, preferably peroxide, is present in the elastomeric compound, no catalyst is required in the elastomeric coating formulation.

In a preferred embodiment, the coating is made from substantially the same base constituents as the bulk elastomeric compound, the resultant coating exhibits the same physical, electrical and environmental characteristics. In addition, the coating provides the surface of the elastomeric component with increased lubricity and a lower coefficient of friction than an uncoated elastomeric component.

The coated elastomeric components and the process by which they are made differ from coated elastomer components found in the prior art in that prior art elastomeric coatings rely primarily on mechanical adhesion to the elastomeric component or substrate. Although some coatings may be available that can be chemically bonded to the elastomeric component, these coatings are applied after vulcanization of the elastomeric component and must be vulcanized separately from the elastomeric component in a subsequent step. Such two-step vulcanization processes provide a less effective chemical bond between the coating and the elastomeric component than the process of the present invention. The "transfer" process of the present invention results in coating that is "co-vulcanized" with the elastomeric component and, therefore, an integral part of the elastomeric component that is formed.

In addition to containing a lubricating constituent, the formulated elastomeric coating may include, for example, an EPDM elastomer. However, the formulated coatings may also be based on silicone (VMQ) and other elastomeric polymers.

The elastomeric coating used in the present invention does not require the use of a catalyst in the coating formulation. Instead, the catalyst may be provided in the compound used in forming the elastomeric component. The catalyst, preferably peroxide, infuses into the transferred elastomeric coating during the molding process, resulting in cure of the transferred coating.

The constituents of the elastomeric coating may be charged directly to a ball mill, pebble mill, or similar dispersion equipment and milled to a Hegman fineness of grind of 2 or finer. These constituents may be alternatively mixed by a BANBURY® or similar internal mixer and then suspended in suspension solvents.

The formulated elastomeric coating is preferably based on a peroxide curable elastomeric polymer. The most preferred peroxide curable elastomeric polymers being EPDM (ethylene propylene diene monomer) elastomer, EPR or EPM (ethylene propylene rubber), NBR (acrylonitrile-butadiene rubber), NR (natural rubber), BR (butadiene rubber), IR (isoprene rubber), CSM (chloro-sulfonyl-polyethylene), VMQ (vinyl silicone), PVMQ (phenyl methyl vinyl silicone), FVMQ (flouro methyl vinyl silicone), and ECO (epichlorohydrin rubber). Standard methyl silicone is known simply as MQ. Replacing a small number (typically less than 1%) of the pendent methyl ($CH_3$) groups in MQ with vinyl ($CH_2CH$) groups yields what is known as vinyl methyl silicone, or VMQ.

Preferred embodiments of the invention do not require the use of a catalyst in the formulas. Instead, the catalyst for the reaction is provided by the peroxide in the elastomeric compound. The peroxide diffuses into the transferred coating during the molding process and promotes the cure of the transferred coating.

The coatings are prepared by using methods well known in the art of elastomeric based coatings. The elastomeric polymer material is combined with a solvent and other constituents well known in the art to form the base coating formulation. These constituents can include one or more of the following materials: zinc oxide, paraffin wax, calcined clay, paraffinic oil, silane and additional components which can include polytetrafluoroethylene powder, lead tetroxide, carbon black, nylon and polydimethylsiloxane. Preferred solvents include ketones, toluene, xylenes, trichloroethylene, perchloroethylene, dichloromethane, petroleum distillates (a large family of solvents of various boiling points and solvency) and mixtures of two or more of these solvents.

The constituents of the elastomeric coating may be charged directly to a ball mill, pebble mill or similar dispersion equipment and milled to a fineness of grind of 2 NS or finer, i.e., an NS greater than 2. The fineness of grind gauge referred to herein uses the "NS" Scale which stands for the "Hegman National Standard." For this fineness of grind gauge, the higher numerical designation indicates a finer grind. The Hegman Scale is 0.004 inches deep at the "0" calibration to "8" at the infinite point where the path runs out to the surface of the gauge.

TABLE 1

| Fineness of Grind | | |
|---|---|---|
| Fineness of Grind (NS) | Mils | Microns* |
| 0 | 4.0 | 100.0 |
| 1 | 3.5 | 87.5 |
| 2 | 3.0 | 75.0 |
| 3 | 2.5 | 62.5 |
| 4 | 2.0 | 50.0 |
| 5 | 1.5 | 37.5 |
| 6 | 1.0 | 25.0 |
| 7 | 0.5 | 12.5 |
| 8 | 0.0 | 0.0 |

*For simplicity, 1 mil = 25 µ (instead of 25.4 µ)

In one embodiment, varying amounts of coarse materials and/or powders are blended into the coating formulation to provide the lubricity. It has been found that inorganic materials that have a coefficient less than the coefficient of the elastomeric material can be used to provide lubricity. Preferred materials and/or powders include polymers such as polyamide (nylon), polyethylene, polypropylene, polytetrafluoroethylene, polyacetal, polydimethylsiloxane, polyester and perfluoropolyether, as well as substances such as silicon dioxide, glass microbeads, sand, moylbdenum disulfide, metallic powders, graphite, mica and talc. These materials are added to the coating formulation in amounts sufficient to provide the desired lubricity.

The powder may impart lubricating characteristics to the coating formulation in two ways. The powder may act as a captive powder that displaces most of the elastomeric surface and, thus, impart its own lubricity. An example of such a powder is Nylon 6. The powder can also provide lubricating characteristics as a melted and subsequently cured and chemically bonded intermediate which imparts its own lubricating characteristics to the surface. An example is high density polyethylene ("HDPE").

A preferred coating formulation includes polydimethylsiloxane (silicone oil), perfluoropolyether, fluorosilicone, phenylmethylpolysiloxane or alkymethylpolysiloxane as a processing agent. These agents impart both enhanced processability and lubricity to the coating. They have limited solubility in EPDM and when the coating formulation is applied to a substrate, they slowly "bloom" to the surface of the coating, thereby enhancing the lubricity of the additive powders.

The coating is applied to any intermediate metal or substrate from which the coating will easily release during molding (see FIGS. 1 and 3). Intermediate substrates such as any metal, especially steel and stainless steel, nylon, TEFLON®, glass and MYLAR® have been found to be effective. Conventional application techniques may be used such as brush, dip spray, drawdown or roller coating. The applied coating is air dried at ambient or elevated temperature to remove solvents.

The coated intermediate substrate is positioned in a mold and is either encapsulated by or encapsulates a part of the uncured component compound. As used in the present invention, the term "encapsulate" means that at least part of the encapsulated object is substantially enclosed by the encapsulating medium. Molding techniques may include injection, transfer or compression molding. Under heat and pressure, the coating transfers, cross-links and bonds to the component surface while the elastomeric component is curing (see FIGS. 2 and 4).

The catalyst type (i.e., cure or vulcanization system) for the elastomeric component used in this invention is a peroxide. Accordingly, the EPDM elastomeric component compound, which will receive the transferred coating, can be any formula containing a peroxide that will result in free radical type polymerization. Typical peroxides include dicumyl peroxide and 2,2-bis(t-butylperoxy)diisopropylbenzene at nominal levels of 1 to 6 phr at 100% strength.

The coating may be applied from 0.0005" to 0.020" thick and requires only one molding operation and no trimming of flash or cleaning. The thin coating concentrates the necessary lubricating agent on the surface. In prior art devices, the lubricating constituents are blended with the other materials of the bulk elastomeric compound so that they are dispersed throughout the molded component. As a result, the lubricating constituents are not concentrated on the surface where they are useful. Thus, the molded components of the present invention with the lubricated surface coating significantly reduce the amount of lubricating material that is used, while providing components with substantially the same physical characteristics, especially the modulus or stiffness of the final product.

The present invention allows the transfer of a coating from an intermediate exterior surface to any interior surface regardless of geometry or regularity. The invention also allows the transfer of a coating from an intermediate interior surface, such as a mold, to any exterior surface regardless of geometry or regularity. Moreover, the transfer and subsequent cross-linking of the coating simultaneously occur while the elastomeric component cures.

Since the formulated lubricating coating can be made without a catalyst, shelf life is indefinite.

In Examples 1 and 2, the constituents which impart the lubricating characteristics to the coating formulation are polytetrafluoroethylene and Nylon 6. Alternatively, substitution or addition of other constituents which reduce the coefficient of friction of the elastomeric coating can be used to increase the lubricity. These include high and low-density polethylenes, Nylon 6/6, carbon, molybdenum disulfide, silica, glass microbeads and metallic powders. The addition of other constituents can provide the elastomeric component with desired characteristics such as conductivity, appearance, flame retardance, abrasion resistance, ultraviolet stability, corrosion and chemical resistance.

The formulated elastomeric coating is based on a peroxide cross-linkable elastomeric polymer, preferably an ethylene propylene diene terpolymer (EPDM) elastomer. However, similar results can be achieved with formulated coatings based on ethylene propylene copolymer (EPM), silicone (VMQ), natural rubber (NR) and acrylonitrile butadiene (NBR).

In one embodiment, the elastomeric coating is used with elastomeric components which do not include a peroxide, or do not include sufficient peroxide, by including a catalyst (peroxide) in the coating formulation. The catalyst provides a high cross-link density when the coating is applied to the elastomeric component and cured.

In another embodiment, the media chosen to impart lubricity provides a microporous coating which can retain a lubricant and increase lubricity. If the lubricating agent has sufficient interstitial spaces, a lubricant can be applied to the cured surface of the coating and it will be retained within the spaces. Preferred lubricants are polydimethylsiloxane (silicone oil), perfluoropolyether, fluorosilicone, phenylmethylpolysiloxane and alkymethylpolysiloxane. The trapped lubricant has less tendency to bleed and/or migrate away from the interface and increases the useful life of the elastomeric component.

Multiple coatings can be applied to combine separate effects. An example would be a conductive coating to provide electrical shielding covered with a lubricating coating to aid assembly. Both coatings can be applied, one over the other, and subsequently cured during the vulcanization of the component, as described previously.

EXAMPLES

The example set forth below serves to provide further appreciation of the invention but are not meant in any way to restrict the scope of the invention.

Example 1

In this example, a batch mixture of EPDM polymer, zinc oxide, paraffin wax, polytetrafluoroethylene powder, calcined clay, paraffinic oil and A172 silane was dissolved in a solvent consisting of toluene and xylene. This mixture was charged directly to a ball mill where it was milled to a Fineness of Grind (NS) of greater than 2 to form a coating mixture.

Example 2

In this example, a batch mixture of EPDM polymer, zinc oxide, paraffin wax, calcined clay, A172 silane, lead tetroxide, paraffinic oil, Black MB, polydimethylsiloxane and a solvent consisting of toluene and xylene were milled in a pebble mill to a fineness of grind of greater than 2 NS. Powdered Nylon 6 was then added to the mixture to form the coating. The amount of powdered Nylon 6 added is dependent on desired lubricity or processability.

Thus, while there have been described the preferred embodiments of the present invention, those skilled in the art will realize that other embodiments can be made without departing from the spirit of the invention, and it is intended to include all such further modifications and changes as come within the true scope of the claims set forth herein.

I claim:

1. A method for manufacturing an electrical cable accessory, said method comprising the steps:
    providing a substrate having a desired contour in relation to the electrical cable accessory;
    coating the substrate with an elastomeric material having a first coefficient of friction and comprising a lubricating constituent to form a coated substrate, wherein the lubricating constituent reduces the first coefficient of friction of the elastomeric material;
    contacting the coated substrate with an uncured elastomeric compound having a second coefficient of friction;
    curing the elastomeric material and elastomeric compound by applying heat and pressure sufficient to transfer and chemically bond the elastomeric material to the elastomeric compound; and
    separating the substrate from the elastomeric material and the elastomeric compound, wherein the elastomeric material coating forms a surface on the elastomeric compound and wherein the reduced first coefficient of friction of the elastomeric material coating is less than the second coefficient of friction of the elastomeric compound.

2. The method for manufacturing an electrical cable accessory according to claim 1, wherein the elastomeric material is encapsulated with the elastomeric compound or the elastomeric compound is encapsulated by the elastomeric material.

3. The method for manufacturing an electrical cable accessory according to claim 1, wherein the elastomeric coating comprises a polymer selected from the group consisting of ethylene propylene diene monomer elastomer, ethylene propylene rubber, acrylonitrile-butadiene rubber, natural rubber, butadiene rubber, isoprene rubber, chlorosulfonyl-polyethylene, vinyl silicone, phenyl methyl vinyl silicone, flouro methyl vinyl silicone and epichlorohydrin rubber.

4. The method for manufacturing an electrical cable accessory according to claim 1, wherein the lubricating constituent is a powdered material having a coefficient of friction that is less than the coefficient of friction of the elastomeric material.

5. The method for manufacturing an electrical cable accessory according to claim 1, wherein the elastomeric material is a peroxide curable elastomeric polymer.

6. The method for manufacturing an electrical cable accessory according to claim 1, wherein the lubricating constituent is selected from the group consisting of polyamides, polyethylene, polypropylene, polyacetal, polytetrafluoroethylene, polydimethylsiloxane, polyester, perfluoropolyether, silicon dioxide, glass microbeads, sand, moylbdenum disulfide, metallic powders, graphite, mica and talc.

7. The method for manufacturing an electrical cable accessory according to claim 1, wherein the elastomeric coating or the elastomeric compound comprises a peroxide.

8. The method for coating an elastomeric component according to claim 1, further comprising contacting the coated elastomeric component with a lubricant.

9. The method for coating an elastomeric component according to claim 8, wherein the lubricant is polydimethylsiloxane (silicone oil), perfluoropolyether, fluorosilicone, phenylmethylpolysiloxane or alkymethylpolysiloxane.

10. The method for coating an elastomeric component according to claim 1, wherein the coating has a thickness of from about 0.0005-inch thick to 0.020-inch thick.

* * * * *